US012627751B2

(12) United States Patent
Williams

(10) Patent No.: US 12,627,751 B2
(45) Date of Patent: May 12, 2026

(54) VARIABLE-LENGTH HEADERS

(71) Applicant: MICROSOFT TECHNOLOGY LICENSING, LLC, Redmond, WA (US)

(72) Inventor: Matthew Ian Ronald Williams, London (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 297 days.

(21) Appl. No.: 18/204,193

(22) Filed: May 31, 2023

(65) Prior Publication Data

US 2024/0406292 A1 Dec. 5, 2024

(51) Int. Cl.
H04L 69/22 (2022.01)
H04L 69/324 (2022.01)

(52) U.S. Cl.
CPC ............ H04L 69/22 (2013.01); H04L 69/324 (2013.01)

(58) Field of Classification Search
None
See application file for complete search history.

(56) References Cited

U.S. PATENT DOCUMENTS

| | | | |
|---|---|---|---|
| 7,185,081 B1 | 2/2007 | Liao et al. | |
| 7,227,842 B1 | 6/2007 | Ji et al. | |
| 11,831,743 B1 * | 11/2023 | Herrera | H04L 69/22 |
| 2003/0169735 A1 | 9/2003 | Johnson et al. | |
| 2003/0195973 A1 * | 10/2003 | Savarda | H04L 69/16 709/230 |
| 2004/0213267 A1 | 10/2004 | Nagao | |

(Continued)

FOREIGN PATENT DOCUMENTS

KR 101026558 B1 3/2011

OTHER PUBLICATIONS

Aldiab, et al., "Packet Classification by Multilevel Cutting of the Classification Space: An Algorithmic-Architectural Solution for IP Packet Classification in Next Generation Networks", In Journal of Computer Networks and Communications, vol. 2008, Nov. 2, 2008, 15 Pages.

(Continued)

*Primary Examiner* — Duc T Duong
(74) *Attorney, Agent, or Firm* — Han Gim; Newport IP, LLC

(57) ABSTRACT

The techniques disclosed herein enhance the functionality of computer networking devices through an accelerated packet header analysis algorithm that enables support for variable length headers and vectorized packet header operations. This is accomplished through pre-parsing of the network packet to determine the presence and position of various packet headers (e.g., ethernet, IPv4). The disclosed system can be subsequently configured with a header selector defining a set of target packet headers and target fields within the packet headers. The disclosed system can then utilize the header offsets derived from parsing the packet to process the header selector. By utilizing vectorized operations to calculate field offsets and extract values encoded by the network packet, the disclosed system can match header fields across multiple packet headers. In contrast, many existing solutions are limited to matching a single packet header at a time.

20 Claims, 7 Drawing Sheets

(56)        References Cited

U.S. PATENT DOCUMENTS

| | | | |
|---|---|---|---|
| 2006/0002386 A1 | 1/2006 | Yik et al. | |
| 2009/0109973 A1* | 4/2009 | Ilnicki | H04L 43/12 |
| | | | 370/392 |
| 2011/0116507 A1* | 5/2011 | Pais | H04L 45/00 |
| | | | 370/392 |
| 2012/0033581 A1 | 2/2012 | Torres et al. | |
| 2013/0215906 A1* | 8/2013 | Hidai | H04L 69/12 |
| | | | 370/474 |
| 2013/0269033 A1 | 10/2013 | Amaya Calvo et al. | |
| 2014/0140342 A1 | 5/2014 | Narad | |
| 2014/0185482 A1 | 7/2014 | Jackowski et al. | |
| 2018/0069668 A1 | 3/2018 | Jorgensen | |
| 2019/0379767 A1 | 12/2019 | Sharma | |
| 2021/0176345 A1 | 6/2021 | Urman | |
| 2022/0300213 A1 | 9/2022 | Foo | |
| 2025/0028672 A1* | 1/2025 | Herbert | G06F 13/4282 |
| 2025/0233932 A1* | 7/2025 | Xie | H04L 69/18 |

OTHER PUBLICATIONS

Gigamon, "GigaSMART Masking", Retrieved From: https://docs.gigamon.com/preview/Content/GV-FM-UG/GigaSMART_Masking.html#gigasmart-ops_775341280_1424542, Nov. 13, 2020, 4 Pages.

Kumar V, et al., "A Survey of Packet Classification Tools and Techniques", In Proceedings of International Conference on Computing Communication Control and Automation, Jul. 16, 2015, pp. 103-107.

Rashelbach, et al., "A Computational Approach to Packet Classification", In Repository of arXiv:2002.07584v2, Jul. 13, 2020, 15 Pages.

International Search Report and Written Opinion received for PCT Application No. PCT/US2024/030163, Aug. 12, 2024, 14 pages.

International Preliminary Report on Patentability (Chapter 1) received for PCT Application No. PCT/US2024/030163, mailed on Dec. 11, 2025, 09 pages.

* cited by examiner

PACKET PROCESSING MODULE 202

UPDATED HEADER OFFSET(S) 302

| 0 | 0 | 14 | 14 | 14 | 34 |
|---|---|----|----|----|----|
| ETHERNET TARGET HEADER 304 | | IPV4 TARGET HEADER 306 | | | GTP TARGET HEADER 308 |

+

TARGET FIELD OFFSET(S) 310

| 0 | 4 | 12 | 0 | 10 | 16 | 4 |
|---|---|----|---|----|----|---|
| ETHERNET TARGET FIELD 312A | ETHERNET TARGET FIELD 312B | ETHERNET TARGET FIELD 312C | IPV4 TARGET FIELD 314A | IPV4 TARGET FIELD 314B | IPV4 TARGET FIELD 314C | GTP TARGET FIELD 316 |

=

OVERALL TARGET FIELD OFFSET(S) 318

| 0 | 4 | 12 | 14 | 24 | 30 | 38 |
|---|---|----|----|----|----|----|
| ETHERNET TARGET FIELD 320A | ETHERNET TARGET FIELD 320B | ETHERNET TARGET FIELD 320C | IPV4 TARGET FIELD 322A | IPV4 TARGET FIELD 322B | IPV4 TARGET FIELD 322C | GTP TARGET FIELD 324 |

FIG. 3

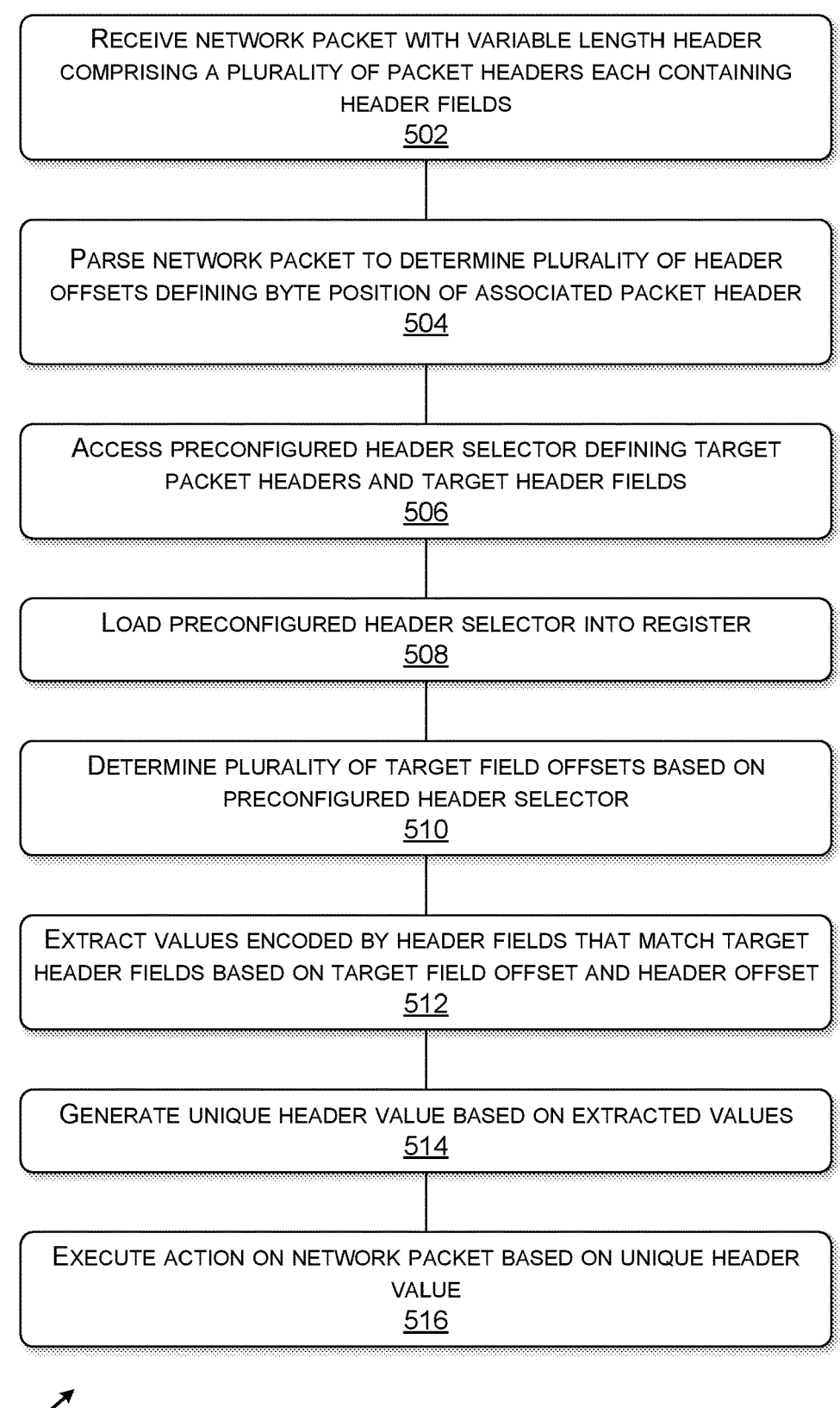

RECEIVE NETWORK PACKET WITH VARIABLE LENGTH HEADER
COMPRISING A PLURALITY OF PACKET HEADERS EACH CONTAINING
HEADER FIELDS
502

PARSE NETWORK PACKET TO DETERMINE PLURALITY OF HEADER
OFFSETS DEFINING BYTE POSITION OF ASSOCIATED PACKET HEADER
504

ACCESS PRECONFIGURED HEADER SELECTOR DEFINING TARGET
PACKET HEADERS AND TARGET HEADER FIELDS
506

LOAD PRECONFIGURED HEADER SELECTOR INTO REGISTER
508

DETERMINE PLURALITY OF TARGET FIELD OFFSETS BASED ON
PRECONFIGURED HEADER SELECTOR
510

EXTRACT VALUES ENCODED BY HEADER FIELDS THAT MATCH TARGET
HEADER FIELDS BASED ON TARGET FIELD OFFSET AND HEADER OFFSET
512

GENERATE UNIQUE HEADER VALUE BASED ON EXTRACTED VALUES
514

EXECUTE ACTION ON NETWORK PACKET BASED ON UNIQUE HEADER
VALUE
516

VARIABLE-LENGTH HEADERS

BACKGROUND

As more data and services are stored and provided online via network connections, providing high performance and an optimal and reliable user experience is an important consideration for network providers and computer networking device manufacturers. In various examples, computer networking devices can include electronic devices that communicate and interact over a computer network via network packets such as gateways, routers, and switches. A network packets can be a formatted unit of data containing control information and user data. Such computer networking devices can implement software programs that process and execute network operations such as packet routing, rewriting, filtering and so forth.

To control how a network packet is processed by a computer network device, the network packet can include a packet header comprising fields that encode values defining characteristics of the network packet. Such packet headers can be formatted for compatibility with standard networking protocols such as the internet protocol (IPv4, IPv6), ethernet protocol, GPRS Tunnelling Protocol (GTP), Transmission Control Protocol (TCP), User Datagram Protocol (UDP), and so forth. For instance, an ethernet header can include information identifying a destination hardware device and a source hardware device. In another example, an IPv4 header can include information identifying destination network address and a source network address. In many scenarios, an individual network packet can include several packet headers to enable processing by different layers of a computing network (e.g., internet layer, transport layer). Moreover, some standard protocols can also include optional extension headers that may or may not be utilized to encode additional information.

Consequently, the flexibility of networking protocols can result in packet headers that vary in length. For example, a packet header that includes an ethernet header and an IPv4 header can be a different length from another packet header that includes an ethernet header and an IPv6 header with additional extension headers. As such, modern computer networking devices must include functionality to accommodate variable length packet headers. Unfortunately, many existing solutions assume a fixed length packet header wherein individual header fields occupy a predetermined offset within the packet header and can fail to process network packets that do not conform to the assumed fixed length. Some existing solutions may simply drop packets with variable length headers leading to poor service quality. Other methods may defer such network packets to a "slow path" for processing to avoid dropping packets but consequently incurs increased latency, reduced throughput increased resource consumption, and reduced efficiency. It is with respect to these and other considerations that the disclosure made herein is presented.

SUMMARY

The techniques described herein enhance the functionality of computer networking devices by implementing a packet header analysis algorithm to enable support for variable length packet headers in a performant manner. While the present disclosure is applicable to all types of computing network operations, many of examples described herein are illustrated in the context of packet classification and/or packet rewrite operations. Packet classification can refer to a process which differentiates network packets based on various characteristics such as source address, destination address (e.g., an IP address), protocol type, and the like. Differentiating network packets in this way enables a computing network to implement different services and advanced functionality beyond simple destination-based routing. In addition, rewriting can refer to operations that modify information within the network packet such as a destination address.

In contrast to existing solutions which assume a fixed header length and position, the disclosed techniques can parse a network packet to determine the presence and position (e.g., offsets) of various packet headers within the network packet. These offsets can be utilized by the disclosed system to analyze relevant information within the various packet headers such as device identifiers, IP addresses, and so forth.

For example, the disclosed system can be configured to perform packet classification and receive a header selector that identifies a set of target headers from among the plurality of packet headers within the network packet. In a specific example, the network packet can contain an ethernet header, an IPv4 header, and a GTP header while the header selector can target the ethernet header and the IPv4 header. Moreover, the header selector can include target fields within the target headers. For instance, within the IPv4 header, the header selector can target the source IP address of the network packet while also targeting the source media access control (MAC) address of the ethernet header.

In accordance with the header selector, the disclosed system can determine a set of target field offsets based on the header offsets determined from the initial parsing of the network packet. Accordingly, the target field offsets can be utilized to extract the values encoded by the target fields from the network packet. As will be elaborated upon below, the target field offsets can be formatted as a numerical vector which can be used to effectively mask off portions of the network packet and leave desired data intact.

Subsequently, the extracted values can be further processed by the disclosed system to generate a unique header value based on the specific contents of the network packet. In various examples, the unique header value can also be referred to as a hash value. The unique header value can be utilized to identify a subsequent action that is executed on the network packet. For instance, in a packet classification context, the unique header value can direct to a specific match action such as forwarding, filtering, and so forth. In another example, the action can be a rewrite in which a specific target field (e.g., destination address) is modified and/or replaced.

The techniques of the present disclosure enable several technical benefits over existing approaches. Namely, by parsing the network packet prior to processing the data within, the disclosed system can accommodate variable length headers. In contrast, many existing techniques assume a fixed format for the packet header such as assuming that the twenty-sixth through twenty-ninth bytes of a network packet encode a source address. However, such assumptions may not always hold true for all network packets. As such, network packets that do not conform to these assumptions may not be processed at all (i.e., dropped) or deferred to a much slower processing method leading to reduced service quality and efficiency.

By parsing the network packet and generating header offsets, the disclosed system can dynamically determine the position of various packet headers and constituent header fields irrespective of the length of the overall packet header.

In this way, the disclosed system can introduce support for variable length headers thereby reducing the number of dropped packets.

In another technical benefit of the present disclosure, target fields defined by the header selector can be matched across multiple packet headers in parallel. As mentioned above, the target field offsets can be formatted as a numerical vector which can be processed as a cohesive unit enabling the disclosed system to extract and analyze data from multiple packet headers in parallel. In contrast, many existing solutions may only process one packet header at a time leading to potential detriments to efficiency and throughput and thus reduced service quality. By vectorizing the target field offsets, the disclosed techniques can greatly improve the efficiency of packet processing functions. Moreover, this benefit compounds as the number of target fields increases and may be constrained by hardware configurations (e.g., register size) rather than program design.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIG. 3 illustrates a packet processing module in a second phase of processing a network packet header.

FIG. 5 is a flow diagram showing aspects of a routine for analyzing a variable length packet header to process a network packet.

FIG. 7 is a diagram illustrating a distributed computing environment capable of implementing aspects of the techniques and technologies presented herein.

DETAILED DESCRIPTION

The techniques discussed herein enhance the functionality of computer networking devices through an accelerated packet header analysis algorithm that enables support for variable length headers and vectorized packet header operations. As the volume of data transmitted over computer networks continues to increase, efficiently processing network packets takes on greater importance for service providers (e.g., cloud computing systems). As mentioned above, a network packet can include a plurality of packet headers such as an ethernet header and an internet protocol version four (IPv4) header and so forth. In this way, the network packet can enable compatibility with various networking protocols at different layers of a computing network (e.g., transport layer, internet layer). Moreover, packet headers can define characteristics of the network packet that dictate how the packet is processed (e.g., routing, filtering, access control). However, many existing solutions for analyzing packet headers can fail to accommodate modern developments in packet header technologies and formats.

Namely, typical approaches can lack support for variable length headers such as extension headers in internet protocol version six (IPv6). Stated another way, typical approaches may assume that various header fields such as the source device, destination address, and so forth, are positioned the same in all network packets (i.e., a fixed offset). However, a network packet utilizing a variable length header can render these assumptions incorrect, in which case existing methods may simply discard (i.e., drop) the network packet and/or offload the network packet to a slow processing path that can be resource intensive, slow, and inefficient. In contrast, by pre-parsing the network packet to determine the presence and/or absence of various packet headers, the disclosed system can dynamically generate packet header offsets on a per network packet basis. In this way, the techniques described herein enable support for variable length headers and vectorized header operations thereby improving efficiency and service quality.

Various examples, scenarios, and aspects that enable enhanced processing of network packets with variable length headers are described below with respect to FIGS. 1-7.

Figure 1:
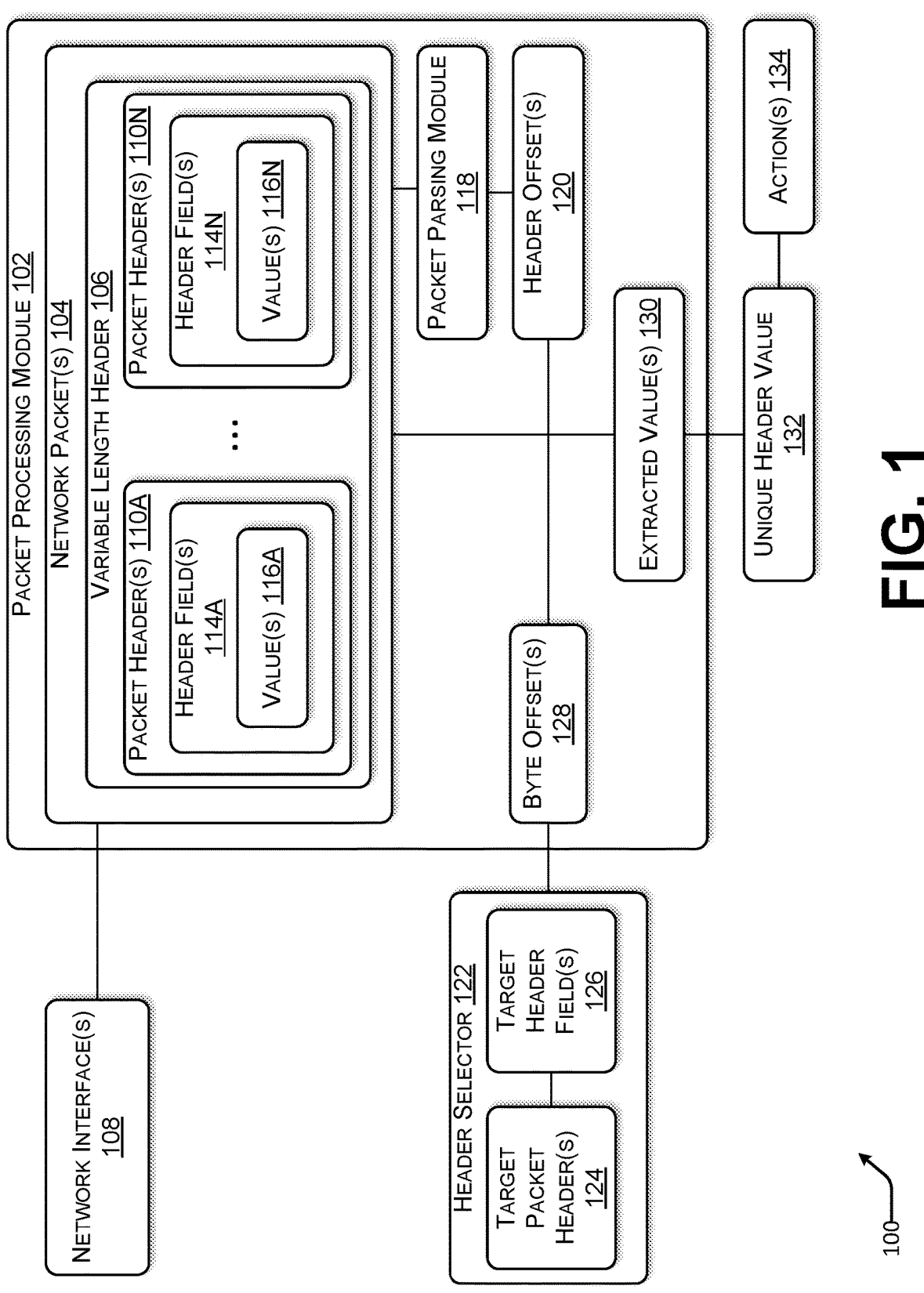
FIG. 1 is a block diagram of a system for processing network packets with variable length headers utilizing vectorized offset operations.

FIG. 1 illustrates a system 100 that utilizes a packet processing module 102 to analyze a network packet 104 that includes a variable length header 106. The packet processing module 102 can be a component of a computing device operating in a computing network environment that implements a packet processing function. The network packet 104 can be received from a network interface 108 such as a router, a network switch, and so forth. In various examples, the variable length header 106 can include a plurality of individual packet headers 110A-110N. Accordingly, each individual packet header 110A-110N can include a constituent plurality of header fields 114A-114N. Furthermore, each individual header field 114A-114N can encode a corresponding value 116A-116N. In a specific example, the packet header 110A can be an IPv4 header in which one header field 114A is a source address field which can encode a value 116A defining a network location of an entity that transmitted the network packet 104. It should be understood that the network packet 104 can contain any number of packet headers 110A-110N hence the variable length header 106.

The network packet 104 can subsequently be parsed by a packet parsing module 118 to generate a plurality of header offsets 120. In various examples, an individual header offset 120 can define a byte position for a corresponding packet headers 110A of the plurality of packet headers 110A-110N. For example, the header offset 120 for the packet header 110A of the variable length header 106 can be "0" indicating that the packet header 110A begins at the first byte of the variable length header 106. In another example, the header offset 120 for another packet header 110N can be "14" indicating that the packet header 110N begins at the fifteenth byte of the variable length header 106.

In addition, the packet processing module 102 can receive a preconfigured header selector 122 that defines a plurality of target packet headers 124 and a corresponding plurality of target header fields 126. For instance, a target packet header 124 can be an ethernet packet header 110A where the associated set of target header fields 126 can be a source media access control (MAC) address header field and/or an ethertype header field 114A. In response, the packet processing module 102 can analyze the header selector to calculate a set of byte offsets 128 based on the header offsets 120 that define the position of the target header fields 126 within the variable length header 106.

The packet processing module 102 can then apply the byte offsets 128 to the network packet 104 to produce a set of extracted values 130. Stated another way, the extracted values 130 can include the values encoded by header fields 114 that match the target header fields 126 defined by the header selector 122 which are extracted from the network packet 104. As will be elaborated upon below, the byte offsets 128 can be formatted as a numerical vector that enables the plurality of target header fields 126 to be matched against the header fields 114 of the network packet 104 in parallel. This is in contrast to many existing techniques which may require each target header field 126 to be matched individually against the network packet 104. As such, the disclosed techniques can reduce processing times associated with searching for target header fields 126.

To complete processing of the network packet 104, the packet processing module 102 can calculate a unique header value 132 based on the extracted values 130. In various examples, the unique header value 132 can be referred to as a has value which enables the system 100 to index into an associated action 134 for execution on the network packet 104. For instance, the system 100 can be a component in a network packet classifier that processes network packets 104 by matching the values 116 encoded by the various header fields 114 to a set of rules. As such, the unique header value 132 can be indexed to a match action 134 such as filtering the network packet 104, routing the network packet 104, and so forth. In another example, the action 134 can be a rewrite operation in which the values 116 encoded by header fields 114 that match the target header fields 126 are modified. In an alternative example, the rewrite operation may modify header fields 114 that are different from the target header fields 126.

Figure 2:
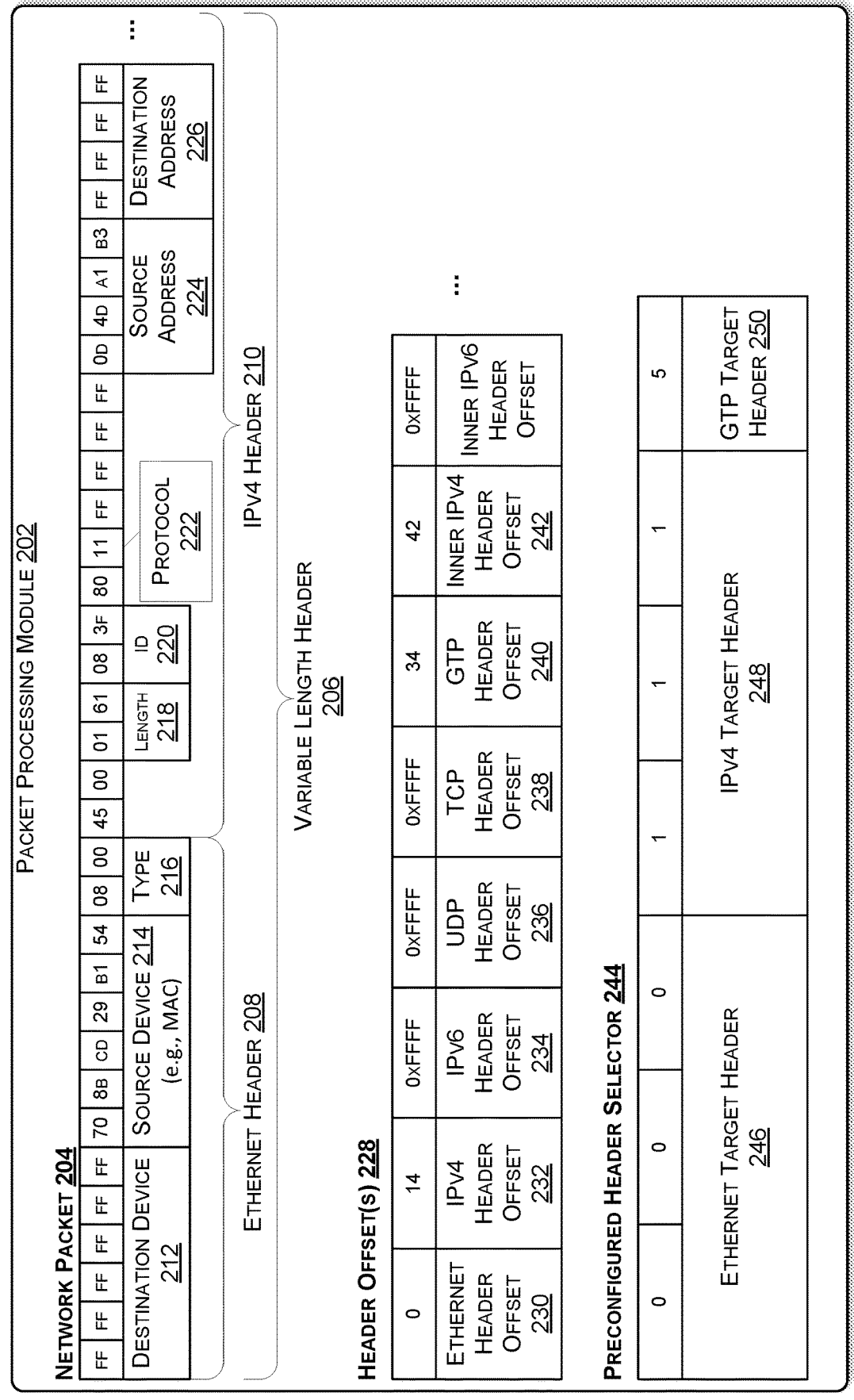
FIG. 2 illustrates a packet processing module in a first phase of processing a network packet header.
Figure 4:
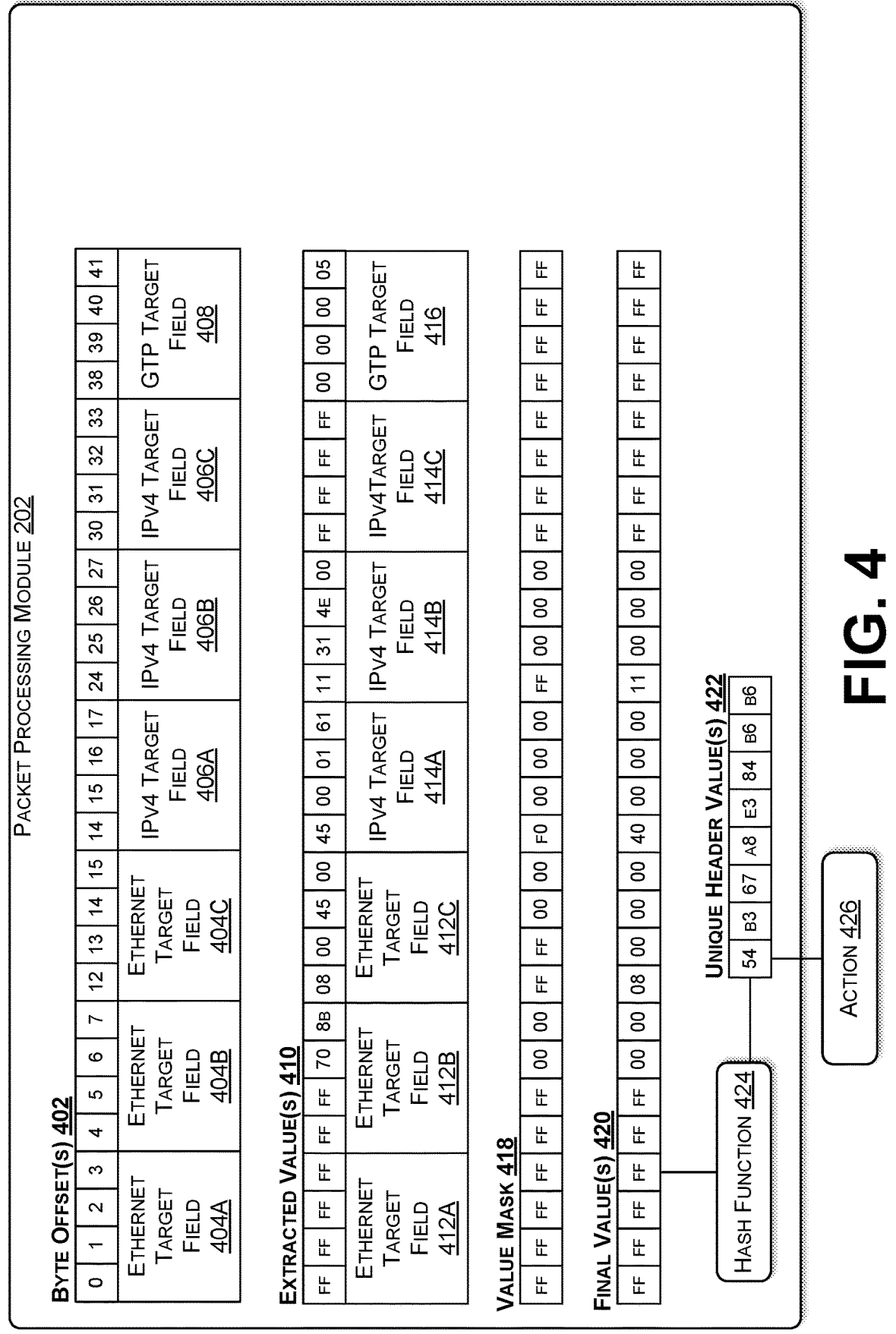
FIG. 4 illustrates a packet processing module in a third phase of processing a network packet header.

Turning now to FIGS. 2 through 4, various technical aspects of a packet processing module 202 are shown and described. As mentioned above, the packet processing module 202 can receive a network packet 204 with a variable length header 206 that contains a plurality of packet headers such as an ethernet header 208, an IPv4 header 210 and so forth. Accordingly, each of the ethernet header 208 and the IPv4 header 210 can include a set of header fields 212-216 and 218-226 respectively. For instance, the ethernet header 208 can include a destination device field 212 identifying a destination computing device of the network packet 204. It should be understood that while the present examples illustrate a variable length header 206 having an ethernet header 208 and an IPv4 header 210, the variable length header 206 can contain any number of packet headers.

The network packet 204 can be subsequently parsed by the packet processing module 202 to generate a set of header offsets 228 indicating a byte position of various packet headers within the variable length header 206. For example, an ethernet header offset 230 can be assigned a value of "0", indicating that ethernet header 208 begins at the first byte of the network packet 204. Likewise, an IPv4 header offset 232 can be assigned a value of "14" indicating the IPv4 header 210 begins at the fifteenth byte of the network packet 204 as illustrated. Conversely, packet headers that are absent from the network packet 204 can be assigned a default value such as 0xFFFF to indicate the associated packet header is no present in the network packet 204. For instance, the network packet 204 may not include an IPv6 header, a UDP header, or a TCP header. Accordingly, the IPv6 header offset 234, the UDP header offset 236, and the TCP header offset 238 can be assigned a value of "0xFFFF". Moreover, the network packet 204 can include a general packet radio service (GPRS) tunneling protocol (GTP) header and an inner IPv4 header. In the interest of clarity, the GTP header and the inner IPv4 header are not illustrated in FIG. 2. As such, the header offsets 228 can include a GTP header offset 240 and an inner IPv4 header offset 242 which can be assigned values of thirty-four and forty-two respectively to indicate associated byte positions in the network packet 204.

In addition, the network packet 204 can be reparsed in response to detecting changes to the network packet 204. For instance, the network packet 204 may be encrypted and accordingly decrypted for analysis. Decryption can modify the data within the network packet 204. As such, the packet processing module 202 can reparse the network packet 204. In another example, the network packet 204 may undergo significant structural change such as removed and/or added packet headers, modifications to header fields, and so forth. In response to detecting such structural changes, the packet processing module 202 can reparse the network packet 204 to ensure the header offsets 228 are up to date.

In various examples, the header offsets 228 can be formatted as a numerical vector for compatibility with various instruction set architectures and hardware configurations such as register sizes. For example, each the header offsets can be formatted as a vector of sixteen entries of sixteen bits each. That is, the header offsets 228 can be formatted as a 256-bit vector for compatibility with various standards such as the 256-bit registers of the advanced vector extensions (AVX2) standard.

The packet processing module 202 can then receive a preconfigured header selector 244 which defines a plurality of target headers as indexes of the header offsets 228. In various examples, the preconfigured header selector 244 can identify target headers on a per thirty-two-bit field basis. In various examples, the preconfigured header selector 244 can be the header selector 122 discussed above with respect to FIG. 1. That is, the preconfigured header selector 244 can define a target header and the number of target fields in the target header. For example, the preconfigured header selector 244 can include an ethernet target header 246. As shown, the ethernet target header 246 can also include three fields each having a value of "0" which can index to the first entry of the header offsets 228 which, in the present example, is the ethernet header offset 230. In addition, the preconfigured header selector 244 can include an IPv4 target header 248 which can likewise include three thirty-two-bit fields. Each of the fields for the IPv4 target header 248 can be assigned a value of "1" which can index to the second entry of the header offsets 248, the IPv4 header offset 232. In still another example, the preconfigured header selector 244 can include a GTP target header 250 which can include just one thirty-two-bit field assigned a value of "5" indexing the sixth entry of the header offsets 228, the GTP header offset 240.

In various examples, the preconfigured header selector 244 can be formatted as a numerical vector like the header offsets 228. For instance, the preconfigured header selector 244 can be formatted as a set of eight thirty-two-bit fields resulting in a vector that is 256 bits in length. In an alternative example, the fields can be formatted as sixteen-bit entries resulting instead in a vector that is 128 bits in length. The format of various components such as the header offsets 228 and/or the preconfigured header selector 244 can be adjusted based on various factors such as instruction set architecture, hardware configurations, performance considerations and so forth.

Turning now to FIG. 3, the packet processing module 202 continues processing the network packet 204 by generating a set of updated header offsets 302 based on the header offsets 228 and the preconfigured header selector 244. In a specific example, the packet processing module 202 can permute the header offsets 228 using the preconfigured header selector 244 to produce the updated header offsets 302. As shown in FIG. 3, the value assigned to the three thirty-two-bit fields of the ethernet target header 304 can be "0" due to ethernet header offset 230 being the first entry of the header offsets 228 and the ethernet header 208 beginning at the first byte of the network packet 204. In another example, the value of the three fields of the IPv4 target header 306 can be "14" since the IPv4 target header 248 defined by the preconfigured header selector 244 indexes to the second entry of the header offsets 228, the IPv4 header offset 232. Likewise, the one field of the GTP target header 308 can be assigned a value of "34" due to indexing to the sixth entry of the header offsets 228 which in turn defines an offset of thirty-four bytes.

The packet processing module 202 can subsequently receive a set of target field offsets 310 defining a byte position of various target fields within an associated target header 304-308. In various examples, the target field offsets 310 can be the target header fields 126 discussed above with respect to FIG. 1. For example, the target field offsets 310 can include a first ethernet target field 312A which can be assigned a value of "0" indicating the ethernet target field 312A targets the first byte of the ethernet header 208. Likewise, a second ethernet target field 312B and a third ethernet target field 312C can target the fifth and thirteenth bytes of the ethernet header 208 respectively. Similarly, the target field offsets 310 can include IPv4 target fields 314A-314C targeting the first, eleventh, and seventeenth bytes of the IPv4 header 210 and a GTP target field 316 targeting the fifth byte of the GTP header. As shown, the number of target field offsets 310 can correspond to the number of target fields defined by the preconfigured header selector 244 as discussed above. Due to the well-defined nature of standard header formats (e.g., ethernet, IPv4, UDP) the target field offsets 310 can be configured as fixed offsets. Stated another way, the byte position of various fields within a packet header of a given standard most likely remain static thereby allowing the assumption of fixed target field offsets 310. In the event these byte positions are changed, the packet processing module 202 can process the modified header as a separate packet header (e.g., a subheader).

Utilizing the updated header offsets 302 and the target field offsets 310, the packet processing module 202 can generate a set of overall target field offsets 318 defining a byte position of each of the target fields 312A-316 within the network packet 204. In various examples, the overall target field offsets 318 can be generated by summing the updated header offsets 302 and the target field offsets 310. For instance, the updated header offsets 302 and the target field offsets 310 can be formatted as numerical vectors. As such, the packet processing module 202 can execute a vector addition to sum the entries of the updated header offsets 302 with the target field offsets 310. For example, a first ethernet target field 320A of the overall target field offsets 318 can be calculated by summing the first entry of the ethernet target header 304 with the first ethernet target field 312A of the target field offsets 310. Likewise, the same vector addition can be performed to generate a second ethernet target field 320B and a third ethernet target field 320C. In another example, the packet processing module can generate the IPv4 target fields 322A-322C by summing the entries of the IPv4 target header 306 with the IPv4 target fields 314A-314C of the target field offsets 310 and so forth. The same operation can be executed to generate the GTP target field 324.

Proceeding now to FIG. 4, the packet processing module 202 can generate a set of byte offsets 402 utilizing the overall target field offsets 318 as discussed above. In a specific example, the byte offsets 402 can be generated by deconstructing the target fields 320A-324. As mentioned, an individual target field such as the first ethernet target field 320A can be formatted as a thirty-two-bit (i.e., four-byte) entry. To increase the granularity of the header analysis, the packet processing module 202 can decompose the first ethernet target field 320A into a modified ethernet target field 404A comprising the constituent bytes of the first ethernet target field 320A. For instance, the ethernet target field 320A of the overall target field offsets 318 as shown above can be assigned a value of "0" indicating that the first ethernet target field 320A begins at the first byte of the network packet 204. Accordingly, the ethernet target field 404A of the byte offsets 402 can be assigned a value of "0123" indicating that the first ethernet target field 404A targets the first four bytes of the network packet 204.

As with the operations discussed above, the packet processing module 202 can execute a vector operation to generate the full set of byte offsets 402. That is, the ethernet target fields 404A-404C, the IPv4 target fields 406A-406C, and the GTP target field 408 can be generated in parallel utilizing a single vectorized operation. Stated another way, the overall target field offsets 318, formatted as a numerical vector, can be converted to the byte offsets 402 as a cohesive unit. In a specific example, the plurality of byte offsets 402 can be generated utilizing a broadcast operation from a standard instruction set such as AVX2.

The packet processing module 202 can accordingly apply the byte offsets 402 to the network packet 204 to generate a set of extracted values 410. In various examples, the set of extracted values 410 can also be referred to as a shuffled packet as the extracted values 410 can comprise the values encoded by the various header fields 212-226 of the network packet 204. As described above with respect to other operations of the packet processing module 202, the packet processing module 202 can generate the set of extracted values 410 utilizing a single vector operation. Stated another way, the values encoded by the network packet 204 can be formatted as a first numerical vector while the byte offsets 402 can be formatted as a second numerical vector. In a specific example, the packet processing module 202 can utilize a permute operation from a standard instruction set such as AVX2 to generate the set of extracted values 410 in a single vectorized operation.

Accordingly, the extracted values 410 can include values encoded by header fields 212-226 that match a given target header field. For instance, the ethernet target field 412A of the extracted values can be assigned the values targeted by the ethernet target field 404A defined by the byte offsets 402 (i.e., the bytes 0-3 of the network packet 204 as shown in FIG. 2). In another example, the second IPv4 target field 414B of the extracted values 410 can be assigned the values encoded by bytes 24-27 of the network packet 204 as defined by the corresponding IPv4 target field 406B of the byte offsets 402. As mentioned above, by utilizing vectorized operations as shown in FIG. 4, the packet processing module 202 can match values encoded by the network packet 204 across multiple packet headers such as the ethernet header 208 and the IPv4 header 210. In this way, the disclosed system can improve efficiency and performance in relation to many existing approaches which may be limited to processing one packet header at a time.

In various examples, a given task may not utilize the full value encoded by a given target field such as an IPv4 target field 414A. For instance, a packet classifier may only require the first four bits of the IPv4 header 210 and the first byte of the protocol field 222 of the IPv4 header 210. Accordingly, the packet processing module 202 can receive a preconfig-ured value mask 418 that can enable the packet processing module 202 to selectively filter the extracted values 410. The value mask 418 be automatically generated by another component of the computing network and/or manually gen-erated by a user (e.g., a system engineer, a technician).

Subsequently, the packet processing module 202 can generate a set of final values 420 by applying the value mask 418 to the extracted values 410. For example, the packet processing module 202 can execute a logical AND operation on the extracted values 410 and the value mask 418. As with the other operations discussed above, the packet processing module 202 can utilize a single vectorized operation to generate the final values 420 to improve efficiency.

Accordingly, the final values 420 can be utilized by the packet processing module 202 to generate a unique header value 422. In a specific example, the final values 420 can serve as the input (e.g., a key) to a hash function 424 to map the final values 420 derived from the network packet 204 to a unique header value 422. In turn, the unique header value 422 can define an associated action 426 for execution on the network packet 204. For instance, the action 426 can be a match action defined by a packet classifier such as packet filtering, routing, access control and so forth. In another example, the action 426 can be a rewrite action modifying the values encoded by the various fields 212-226 of the network packet.

Proceeding now to FIG. 5, aspects of a routine 500 for processing a network packet with a variable length header are shown and described. With reference to FIG. 5, the routine 500 begins at operation 502 wherein a packet processing system receives a network packet having a variable length header containing a plurality of packet headers, each of the packet headers containing a correspond-ing plurality of header fields wherein each header field encodes a value.

Next, at operation 504, the packet processing system parses the network packet to determine a plurality of header offsets, wherein each header offset corresponds to one of the plurality of packet headers, each header offset defining a byte position of an associated packet header within the network packet.

Then, at operation 506, the packet processing system accesses a preconfigured header selector defining a plurality of target packet headers and a corresponding plurality of target header fields.

Subsequently, at operation 508, the packet processing system loads the preconfigured header selector into the register associated with the processor, wherein the precon-figured header selector is configured to fit within a size of the register.

Then, at operation 510, the packet processing system determines, based on the preconfigured header selector, a plurality of target field offsets, wherein each target field offset corresponds to one of the plurality of target header fields.

Next, at operation 512, the packet processing system extracts, for a given target header field of the plurality of target header fields, the value encoded by a header field that matches the given target header field based on the corre-sponding target field offset and header offset.

Subsequently, at operation 514, the packet processing system generates a unique header value based on the extracted values for the plurality of target header fields.

Finally, at operation 516 the packet processing system executes an action on the network packet based on the unique header value, wherein the plurality of target header fields is matched to the plurality of header fields of the network packet as a vectorized process in the processor to enable parallel application of the preconfigured header selector across the plurality of packet headers of the network packet.

For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted. Furthermore, one or more of the provided operations may also be executed in parallel and/or interleaved when pro-cessing multiple network packets.

The particular implementation of the technologies dis-closed herein is a matter of choice dependent on the per-formance and other requirements of a computing device. Accordingly, the logical operations described herein are referred to variously as states, operations, structural devices, acts, or modules. These states, operations, structural devices, acts, and modules can be implemented in hardware, soft-ware, firmware, in special-purpose digital logic, and any combination thereof. It should be appreciated that more or fewer operations can be performed than shown in the figures and described herein. These operations can also be per-formed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "com-puter-readable instructions," and variants thereof, as used in the description and claims, is used expansively herein to include routines, applications, application modules, program modules, programs, components, data structures, algo-rithms, and the like. Computer-readable instructions can be implemented on various system configurations, including single-processor or multiprocessor systems, minicomputers, mainframe computers, personal computers, hand-held com-puting devices, microprocessor-based, programmable con-sumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 500 can be implemented, at least in part, by modules running the features disclosed herein can be a dynamically linked library (DLL), a statically linked library, functionality produced by an application programing interface (API), a compiled program, an interpreted program, a script, or any other executable set of instructions. Data can be stored in a data structure in one or more memory components. Data can be retrieved from the data structure by addressing links or references to the data structure.

Although the illustration may refer to the components of the figures, it should be appreciated that the operations of the routine 500 may be also implemented in other ways. In addition, one or more of the operations of the routine 500 may alternatively or additionally be implemented, at least in part, by a chipset working alone or in conjunction with other software modules. In the example described below, one or more modules of a computing system can receive and/or process the data disclosed herein. Any service, circuit, or application suitable for providing the techniques disclosed herein can be used in operations described herein.

Figure 6:
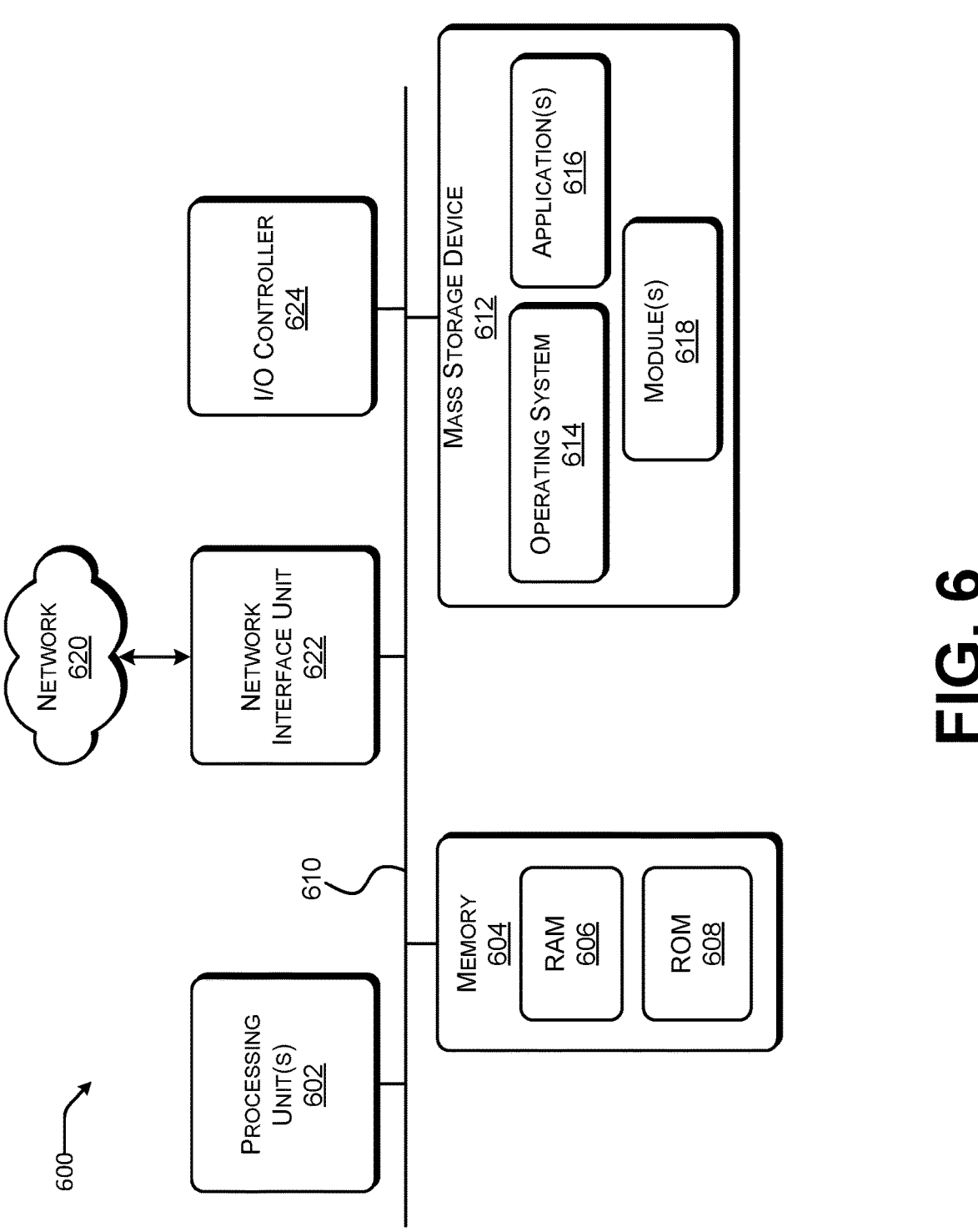
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as a computer or a server configured as part of the cloud-based platform or system 100, capable of executing computer instructions (e.g., a module or a program component described herein). The computer architecture 600 illustrated in FIG. 6 includes processing system 602, a system memory 604, including a random-access memory 606 (RAM) and a read-only memory (ROM) 608, and a system bus 610 that couples the memory 604 to the processing system 602. The processing system 602 comprises processing unit(s). In various examples, the processing unit(s) of the processing system 602 are distributed. Stated another way, one processing unit of the processing system 602 may be located in a first location (e.g., a rack within a datacenter) while another processing unit of the processing system 602 is located in a second location separate from the first location.

Processing unit(s), such as processing unit(s) of processing system 602, can represent, for example, a CPU-type processing unit, a GPU-type processing unit, a field-programmable gate array (FPGA), another class of digital signal processor (DSP), or other hardware logic components that may, in some instances, be driven by a CPU. For example, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), and the like.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618, and other data described herein.

The mass storage device 612 is connected to processing system 602 through a mass storage controller connected to the bus 610. The mass storage device 612 and its associated computer-readable media provide non-volatile storage for the computer architecture 600. Although the description of computer-readable media contained herein refers to a mass storage device, the computer-readable media can be any available computer-readable storage media or communication media that can be accessed by the computer architecture 600.

Computer-readable media includes computer-readable storage media and/or communication media. Computer-readable storage media includes one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including RAM, static RAM (SRAM), dynamic RAM (DRAM), phase change memory (PCM), ROM, erasable programmable ROM (EPROM), electrically EPROM (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

The software components described herein may, when loaded into the processing system 602 and executed, transform the processing system 602 and the overall computer architecture 600 from a general-purpose computing system into a special-purpose computing system customized to facilitate the functionality presented herein. The processing system 602 may be constructed from any number of transistors or other discrete circuit elements, which may individually or collectively assume any number of states. More specifically, the processing system 602 may operate as a finite-state machine, in response to executable instructions contained within the software modules disclosed herein.

These computer-executable instructions may transform the processing system 602 by specifying how the processing system 602 transition between states, thereby transforming the transistors or other discrete hardware elements constituting the processing system 602.

Figure 7:
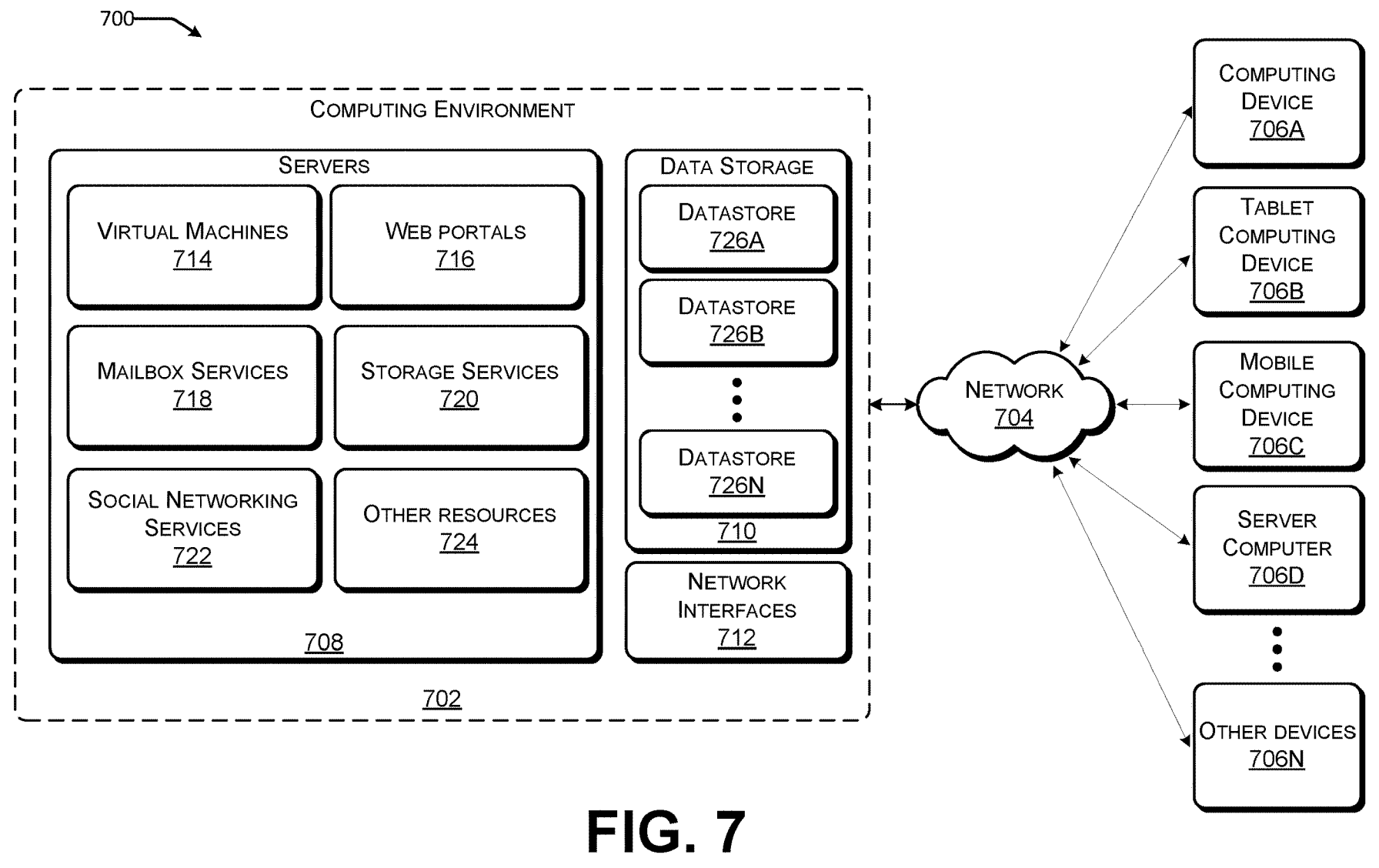

FIG. 7 depicts an illustrative distributed computing environment 700 capable of executing the software components described herein. Thus, the distributed computing environment 700 illustrated in FIG. 7 can be utilized to execute any aspects of the software components presented herein. For example, the distributed computing environment 700 can be utilized to execute aspects of the software components described herein.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "computing devices 706") can communicate with the computing environment 702 via the network 704. In one illustrated configuration, the computing devices 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of computing devices 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 700. The data storage 710 can include, host, or provide one or more real or virtual datastores 726A-726N (hereinafter referred to collectively and/or generically as "datastores 726"). The datastores 726 are configured to host data used or created by the servers 708 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

The disclosure presented herein also encompasses the subject matter set forth in the following clauses.

Example Clause A, a method for processing a network packet with a variable length header, the method performed by a packet processing function of a computing device operating in a computing network environment, the packet processing function configured to analyze a plurality of packet headers of the network packet based on a preconfigured header field selector, the computing device having a processor associated with a register and an instruction set, the method comprising: receiving the network packet with the variable length header containing a plurality of packet headers, each of the packet headers containing a corresponding plurality of header fields wherein each header field encodes a value; parsing the network packet to determine a plurality of header offsets, wherein each header offset corresponds to one of the plurality of packet headers, each header offset defining a byte position of an associated packet header within the network packet; accessing a preconfigured header selector defining a plurality of target packet headers and a corresponding plurality of target header fields; loading the preconfigured header selector into the register associated with the processor, wherein the preconfigured header selector is configured to fit within a size of the register; determining, based on the preconfigured header selector, a plurality of target field offsets, wherein each target field offset corresponds to one of the plurality of target header fields; extracting, for a given target header field of the plurality of target header fields, the value encoded by a header field that matches the given target header field based on the corresponding target field offset and header offset; generating a unique header value based on the extracted values for the plurality of target header fields; and executing an action on the network packet based on the unique header value, wherein the plurality of target header fields is matched to the plurality of header fields of the network packet as a vectorized process in the processor to enable parallel application of the preconfigured header selector across the plurality of packet headers of the network packet.

Example Clause B, the method of Example Clause A, wherein: the register is a first register; the plurality of header offsets is loaded into a second register; the plurality of header offsets is configured to fit within a size of the second register; and the size of the second register is different from the size of the first register.

Example Clause C, the method of Example Clause A or Example Clause B, wherein determining the plurality of target field offsets comprises: calculating a plurality of updated header offsets based on the preconfigured header field selector and the plurality of header offsets; receiving a plurality of preconfigured field offsets defining a position of the plurality of target header fields within the plurality of target packet headers; and summing the plurality of updated header offsets and the plurality of preconfigured field offsets.

Example Clause D, the method of any one of Example Clause A through C, wherein extracting the value encoded by the header field that matches the given target header field comprises: generating a plurality of byte offsets based on the plurality of target field offsets; and applying the plurality of byte offsets to the network packet.

Example Clause E, the method of any one of Example Clause A through E further comprising: detecting an update to the network packet, the update causing a structural change to the plurality of packet headers of the network packet; and in response to detecting the update to the network packet, reparsing the network packet to determine a changed plurality of header offsets.

Example Clause F, the method of any one of Example Clause A through E, wherein the action is a forwarding match action of a packet classifier.

Example Clause G, the method of any one of Example Clause A through E, wherein the action is a data rewrite action.

Example Clause H, a system for processing a network packet with a variable length header, the system having a processor associated with a register and an instruction set, the system comprising: a processing unit; and a computer readable medium having encoded thereon computer readable instructions that when executed by the processing unit cause the system to: receive the network packet with the variable length header containing a plurality of packet headers, each of the packet headers containing a corresponding plurality of header fields wherein each header field encodes a value; parse the network packet to determine a plurality of header offsets, wherein each header offset corresponds to one of the plurality of packet headers, each header offset defining a byte position of an associated packet header within the network packet; receive a preconfigured header selector defining a plurality of target packet headers and a corresponding plurality of target header fields; load the preconfigured header selector into a register associated with the processor, wherein the preconfigured header selector is configured to fit within a size of the register; determine, based on the preconfigured header selector, a plurality of target field offsets, wherein each target field offset corresponds to one of the plurality of target header fields; extract, for a given target header field of the plurality of target header fields, the value encoded by a header field that matches the given target header field based on the corresponding target field offset and header offset; generate a unique header value based on the extracted values for the plurality of target header fields; and execute an action on the network packet based on the unique header value, wherein the plurality of target header fields is matched to the plurality of header fields of the network packet as a vectorized process in the processor to enable parallel application of the preconfigured header selector across the plurality of packet headers of the network packet.

Example Clause I, the system of Example Clause H, wherein: the register is a first register; the plurality of header offsets is loaded into a second register; the plurality of header offsets is configured to fit within a size of the second register; and the size of the second register is different from the size of the first register.

Example Clause J, the system of Example Clause H or Example Clause J, wherein determining the plurality of target field offsets comprises: calculating a plurality of updated header offsets based on the preconfigured header selector and the plurality of header offsets; receiving a plurality of preconfigured field offsets defining a position of the plurality of target header fields within the plurality of target packet headers; and summing the plurality of updated header offsets and the plurality of preconfigured field offsets.

Example Clause K, the system of any one of Example Clause H through J, wherein extracting the value encoded by the header field that matches the given target header field comprises: generating a plurality of byte offsets based on the plurality of target field offsets; and applying the plurality of byte offsets to the network packet.

Example Clause L, the system of any one of Example Clause H through K, wherein the computer readable instructions further cause the system to: detect an update to the network packet, the update causing a structural change to the plurality of packet headers of the network packet; and in response to detecting the update to the network packet, reparse the network packet to determine a changed plurality of header offsets.

Example Clause M, the system of any one of Example Clause H through L, wherein the action is a forwarding match action of a packet classifier.

Example Clause N, the system of any one of Example Clause H through L, wherein the action is a data rewrite action.

Example Clause O, a computer readable storage medium having encoded thereon computer readable instructions that when executed by a system cause the system to: receive a network packet with a variable length header containing a plurality of packet headers, each of the packet headers containing a corresponding plurality of header fields wherein each header field encodes a value; parse the network packet to determine a plurality of header offsets, wherein each header offset corresponds to one of the plurality of packet headers, each header offset defining a byte position of an associated packet header within the network packet; receive a preconfigured header selector defining a plurality of target packet headers and a corresponding plurality of target header fields; load the preconfigured header selector into a register associated with a processor, wherein the preconfigured header selector is configured to fit within a size of the register; determine, based on the preconfigured header selector, a plurality of target field offsets, wherein each target field offset corresponds to one of the plurality of target header fields; extract, for a given target header field of the plurality of target header fields, the value encoded by a header field that matches the given target header field based on the corresponding target field offset and header offset; generate a unique header value based on the extracted values for the plurality of target header fields; and execute an action on the network packet based on the unique header value, wherein the plurality of target header fields is matched to the plurality of header fields of the network packet as a vectorized process in the processor to enable parallel application of the preconfigured header selector across the plurality of packet headers of the network packet.

Example Clause P, the computer readable storage medium of Example Clause O, wherein: the register is a first register; the plurality of header offsets is loaded into a second register; the plurality of header offsets is configured to fit within a size of the second register; and the size of the second register is different from the size of the first register.

Example Clause Q, the computer readable storage medium of Example Clause O or Example Clause P, wherein determining the plurality of target field offsets comprises: calculating a plurality of updated header offsets based on the preconfigured header selector and the plurality of header offsets; receiving a plurality of preconfigured field offsets defining a position of the plurality of target header fields within the plurality of target packet headers; and summing the plurality of updated header offsets and the plurality of preconfigured field offsets.

Example Clause R, the computer readable storage medium of any one of Example Clause O through Q, wherein extracting the value encoded by the header field that matches the given target header field comprises: generating a plurality of byte offsets based on the plurality of target field offsets; and applying the plurality of byte offsets to the network packet.

Example Clause S, the computer readable storage medium of any one of Example Clause O through R, wherein the computer readable instructions further cause the system to: detect an update to the network packet, the update causing a structural change to the plurality of packet headers of the network packet; and in response to detecting the update to the network packet, reparse the network packet to determine a changed plurality of header offsets.

Example Clause T, the computer readable storage medium of any one of Example Clause O through S, wherein the action is a forwarding match action of a packet classifier.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

In addition, any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different packet headers).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

The invention claimed is:

1. A method for processing a network packet with a variable length header, the method performed by a packet processing function of a computing device operating in a computing network environment, the packet processing function configured to analyze a plurality of packet headers of the network packet based on a preconfigured header field selector, the computing device having a processor associated with a register and an instruction set, the method comprising:

receiving the network packet with the variable length header containing a plurality of packet headers, each of the packet headers containing a corresponding plurality of header fields wherein each header field encodes a value;

parsing the network packet to determine a plurality of header offsets, wherein each header offset corresponds to one of the plurality of packet headers, each header offset defining a byte position of an associated packet header within the network packet;

accessing a preconfigured header selector defining a plurality of target packet headers and a corresponding plurality of target header fields;

loading the preconfigured header selector into the register associated with the processor, wherein the preconfigured header selector is configured to fit within a size of the register;

determining, based on the preconfigured header selector, a plurality of target field offsets, wherein each target field offset corresponds to one of the plurality of target header fields;

extracting, for a given target header field of the plurality of target header fields, the value encoded by a header field that matches the given target header field based on the corresponding target field offset and header offset;

generating a unique header value based on the extracted values for the plurality of target header fields; and executing an action on the network packet based on the unique header value, wherein the plurality of target header fields is matched to the plurality of header fields of the network packet as a vectorized process in the processor to enable parallel application of the preconfigured header selector across the plurality of packet headers of the network packet.

2. The method of claim 1, wherein:

the register is a first register;

the plurality of header offsets is loaded into a second register;

the plurality of header offsets is configured to fit within a size of the second register; and the size of the second register is different from the size of the first register.

3. The method of claim 1, wherein determining the plurality of target field offsets comprises:

calculating a plurality of updated header offsets based on the preconfigured header field selector and the plurality of header offsets;

receiving a plurality of preconfigured field offsets defining a position of the plurality of target header fields within the plurality of target packet headers; and summing the plurality of updated header offsets and the plurality of preconfigured field offsets.

4. The method of claim 1, wherein extracting the value encoded by the header field that matches the given target header field comprises:

generating a plurality of byte offsets based on the plurality of target field offsets; and applying the plurality of byte offsets to the network packet.

5. The method of claim 1 further comprising:

detecting an update to the network packet, the update causing a structural change to the plurality of packet headers of the network packet; and in response to detecting the update to the network packet, reparsing the network packet to determine a changed plurality of header offsets.

6. The method of claim 1, wherein the action is a forwarding match action of a packet classifier.

7. The method of claim 1, wherein the action is a data rewrite action.

8. A system for processing a network packet with a variable length header, the system having a processor associated with a register and an instruction set, the system comprising:

a processing unit; and a computer readable medium having encoded thereon computer readable instructions that when executed by the processing unit cause the system to:

receive the network packet with the variable length header containing a plurality of packet headers, each of the packet headers containing a corresponding plurality of header fields wherein each header field encodes a value;

parse the network packet to determine a plurality of header offsets, wherein each header offset corresponds to one of the plurality of packet headers, each header offset defining a byte position of an associated packet header within the network packet;

receive a preconfigured header selector defining a plurality of target packet headers and a corresponding plurality of target header fields;

load the preconfigured header selector into a register associated with the processor, wherein the preconfigured header selector is configured to fit within a size of the register;

determine, based on the preconfigured header selector, a plurality of target field offsets, wherein each target field offset corresponds to one of the plurality of target header fields;

extract, for a given target header field of the plurality of target header fields, the value encoded by a header field that matches the given target header field based on the corresponding target field offset and header offset;

generate a unique header value based on the extracted values for the plurality of target header fields; and execute an action on the network packet based on the unique header value, wherein the plurality of target header fields is matched to the plurality of header fields of the network packet as a vectorized process in the processor to enable parallel application of the preconfigured header selector across the plurality of packet headers of the network packet.

9. The system of claim 8, wherein:

the register is a first register;

the plurality of header offsets is loaded into a second register;

the plurality of header offsets is configured to fit within a size of the second register; and the size of the second register is different from the size of the first register.

10. The system of claim 8, wherein determining the plurality of target field offsets comprises:

calculating a plurality of updated header offsets based on the preconfigured header selector and the plurality of header offsets;

receiving a plurality of preconfigured field offsets defining a position of the plurality of target header fields within the plurality of target packet headers; and summing the plurality of updated header offsets and the plurality of preconfigured field offsets.

11. The system of claim 8, wherein extracting the value encoded by the header field that matches the given target header field comprises:

generating a plurality of byte offsets based on the plurality of target field offsets; and applying the plurality of byte offsets to the network packet.

12. The system of claim 8, wherein the computer readable instructions further cause the system to:

detect an update to the network packet, the update causing a structural change to the plurality of packet headers of the network packet; and in response to detecting the update to the network packet, reparse the network packet to determine a changed plurality of header offsets.

13. The system of claim 8, wherein the action is a forwarding match action of a packet classifier.

14. The system of claim 8, wherein the action is a data rewrite action.

15. A non-transitory computer readable storage medium having encoded thereon computer readable instructions that when executed by a system cause the system to:

receive a network packet with a variable length header containing a plurality of packet headers, each of the packet headers containing a corresponding plurality of header fields wherein each header field encodes a value;

parse the network packet to determine a plurality of header offsets, wherein each header offset corresponds to one of the plurality of packet headers, each header offset defining a byte position of an associated packet header within the network packet;

receive a preconfigured header selector defining a plurality of target packet headers and a corresponding plurality of target header fields;

load the preconfigured header selector into a register associated with a processor, wherein the preconfigured header selector is configured to fit within a size of the register;

determine, based on the preconfigured header selector, a plurality of target field offsets, wherein each target field offset corresponds to one of the plurality of target header fields;

extract, for a given target header field of the plurality of target header fields, the value encoded by a header field that matches the given target header field based on the corresponding target field offset and header offset;

generate a unique header value based on the extracted values for the plurality of target header fields; and execute an action on the network packet based on the unique header value, wherein the plurality of target header fields is matched to the plurality of header fields of the network packet as a vectorized process in the processor to enable parallel application of the preconfigured header selector across the plurality of packet headers of the network packet.

16. The non-transitory computer readable storage medium of claim 15, wherein:

the register is a first register;

the plurality of header offsets is loaded into a second register;

the plurality of header offsets is configured to fit within a size of the second register; and the size of the second register is different from the size of the first register.

17. The non-transitory computer readable storage medium of claim 15, wherein determining the plurality of target field offsets comprises:

calculating a plurality of updated header offsets based on the preconfigured header selector and the plurality of header offsets;

receiving a plurality of preconfigured field offsets defining a position of the plurality of target header fields within the plurality of target packet headers; and summing the plurality of updated header offsets and the plurality of preconfigured field offsets.

18. The non-transitory computer readable storage medium of claim 15, wherein extracting the value encoded by the header field that matches the given target header field comprises:

generating a plurality of byte offsets based on the plurality of target field offsets; and applying the plurality of byte offsets to the network packet.

19. The non-transitory computer readable storage medium of claim 15, wherein the computer readable instructions further cause the system to:

detect an update to the network packet, the update causing a structural change to the plurality of packet headers of the network packet; and in response to detecting the update to the network packet, reparse the network packet to determine a changed plurality of header offsets.

20. The non-transitory computer readable storage medium of claim 15, wherein the action is a forwarding match action of a packet classifier.

* * * * *